J. B. Thorp
Wood Boring Machine
№ 75813   Patented Mar. 24, 1868.
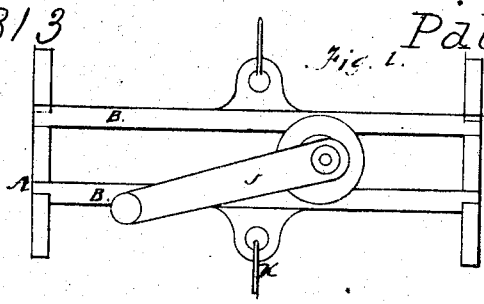
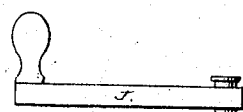
Fig. 2.
Fig. 4.
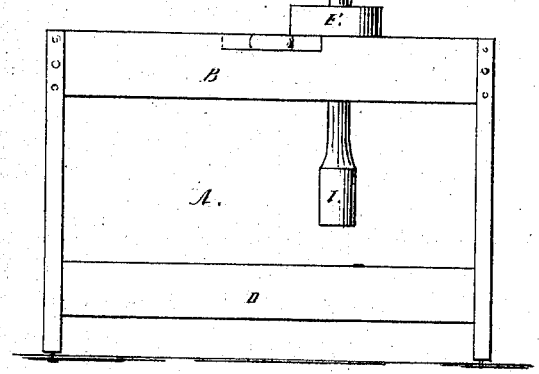
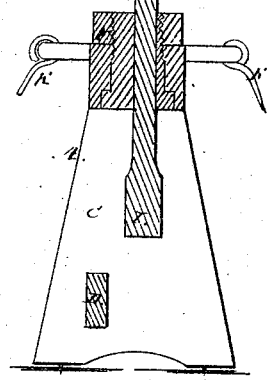
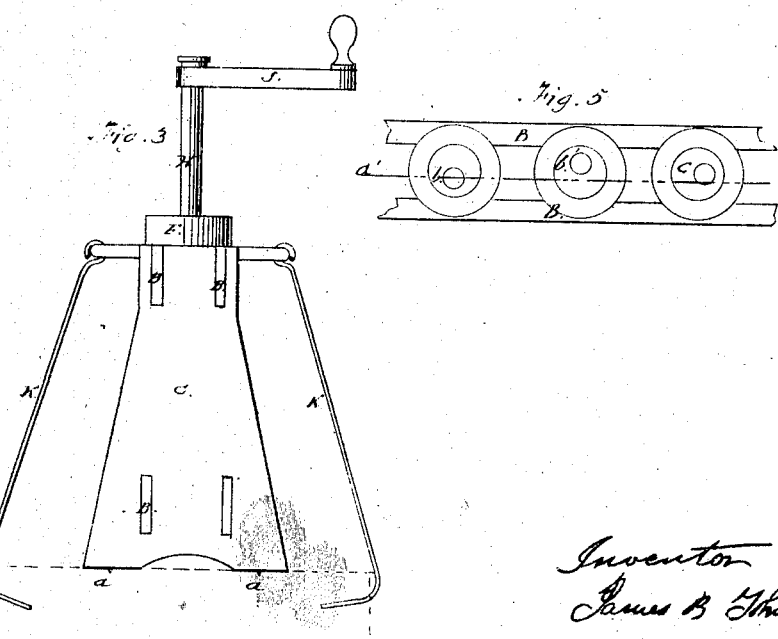
Witnesses
J. H. Burridge
E. E. Witt
Inventor
James B. Thorp

United States Patent Office.

JAMES B. THORP, OF WARRENSVILLE, OHIO.

*Letters Patent No. 75,813, dated March 24, 1868.*

IMPROVEMENT IN WOOD-BORING MACHINES.

*The Schedule referred to in these Letters Patent and making part of the same.*

TO ALL WHOM IT MAY CONCERN:

Be it known that I, JAMES B. THORP, of Warrensville, in the county of Cuyahoga, and State of Ohio, have invented certain new and useful Improvements in Boring-Machines; and I do hereby declare that the following is a full and complete description of the same, reference being had to the accompanying drawings, making a part of this specification, in which—

Figure 1 is a top view of the machine.
Figure 2 is a side elevation.
Figure 3 is an end view.
Figure 4 is a transverse section.
Like letters of reference refer to like parts in the views.

In fig. 2, A represents a frame, consisting of the parallel sides B, fig. 1, connected to the ends C, fig. 3, and braced by the bar or guide D. E, fig. 4, is an eccentric-bush, fitted between the cheeks of the sides B, and along which it is made to slide, as and for a purpose hereafter shown. On the upper end of the bush is cut a screw, to which is fitted a nut, F, by which the bush is secured at any point along the frame. The lower end of the bush is provided with projecting shoulders, G. Said shoulders are fitted in rabbets cut along the lower inner edge of the sides, whereby the bush is prevented from turning around between the sides, and from being drawn upward by the screwing down of the nut. H is a shaft, to the lower end of which is an auger, I, and which is operated by the crank J in the following manner:

The apparatus is placed upon the timber to be bored, and secured to the same by the stay-rods K, the lower ends of which are driven into the timber, as shown in fig. 3, in which K' represents the timber on which the machine is placed. Should it be required to bore a series of holes in a right line with the length of the timber, and at a certain uniform distance from the edge, the machine is so placed as to bring the guide D parallel to the line of boring, and at such a distance from it as to bring the point of the auger on the line. In this position the machine is secured to the timber by the stays referred to, and which is further secured by the points $a$ in the foot of the ends C. The number of holes, on being bored, which may be supposed to be inch holes, and in the line $a'$, fig. 5, another range of holes may be bored parallel to them without shifting the machine, by simply loosening the nut F, and then turning the eccentric-bush between the cheeks of the sides, which will bring the auger from $b$ to $b'$ or $c$, according to the distance required to bore the second range of holes. By this means any number of holes can be bored in exact range with each other, and at any required distance, by moving along the bush from point to point, as the distance of the holes from each other may require, thereby saving the time and trouble of drawing several lines, and marking each point where the holes are to be bored, as the bar D serves as a guide for the direction of the work.

It will be obvious that different-sized augers may be used in this machine, by simply changing or turning around the bush to one side of the parallel sides B, to the other, more or less, according to the size of the auger. By this movement of the bush, holes may be bored transversely across the timber, for mortises, &c. By elevating one end of the sides B, holes may be bored obliquely into the timber, and at any desired angle.

Any of the augers in common use can be used in this machine, it being only necessary to remove the handle and insert the shaft in the eccentric-bush, and operate the same by the crank J.

What I claim as my improvement, and desire to secure by Letters Patent, is—

The eccentric-bush E, carrying the shaft of the auger, so constructed and arranged that it can be revolved within the nut F and clamped in any desired position, substantially in the manner and for the purpose set forth.

JAMES B. THORP.

Witnesses:
 W. H. BURRIDGE,
 J. HOLMES.